Oct. 28, 1941.            N. CADWELL            2,260,433
                        UNLOADING DEVICE
                       Filed June 27, 1939          4 Sheets-Sheet 2
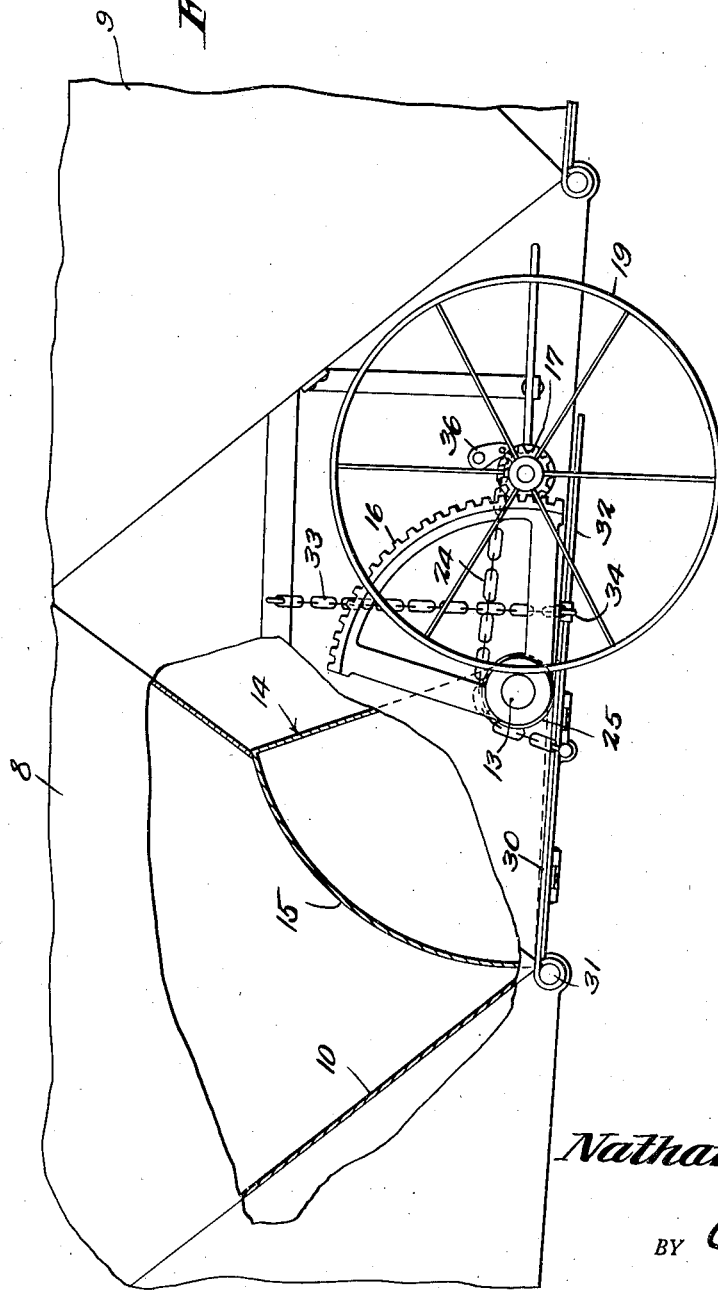
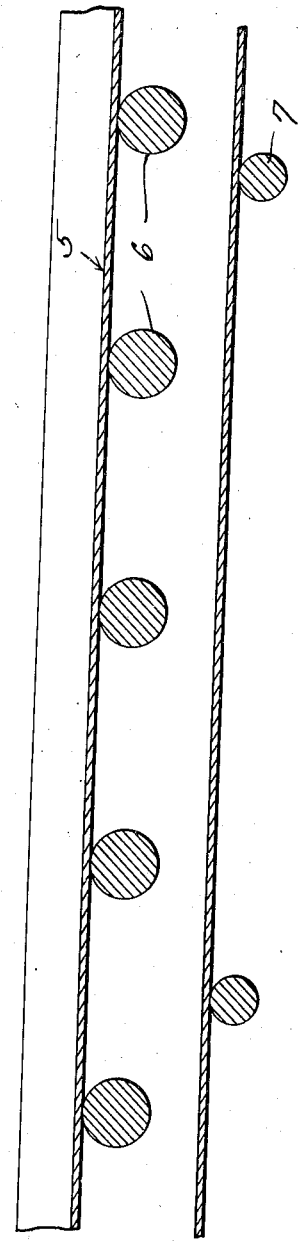
Nathan Cadwell
INVENTOR.
BY
ATTORNEYS.

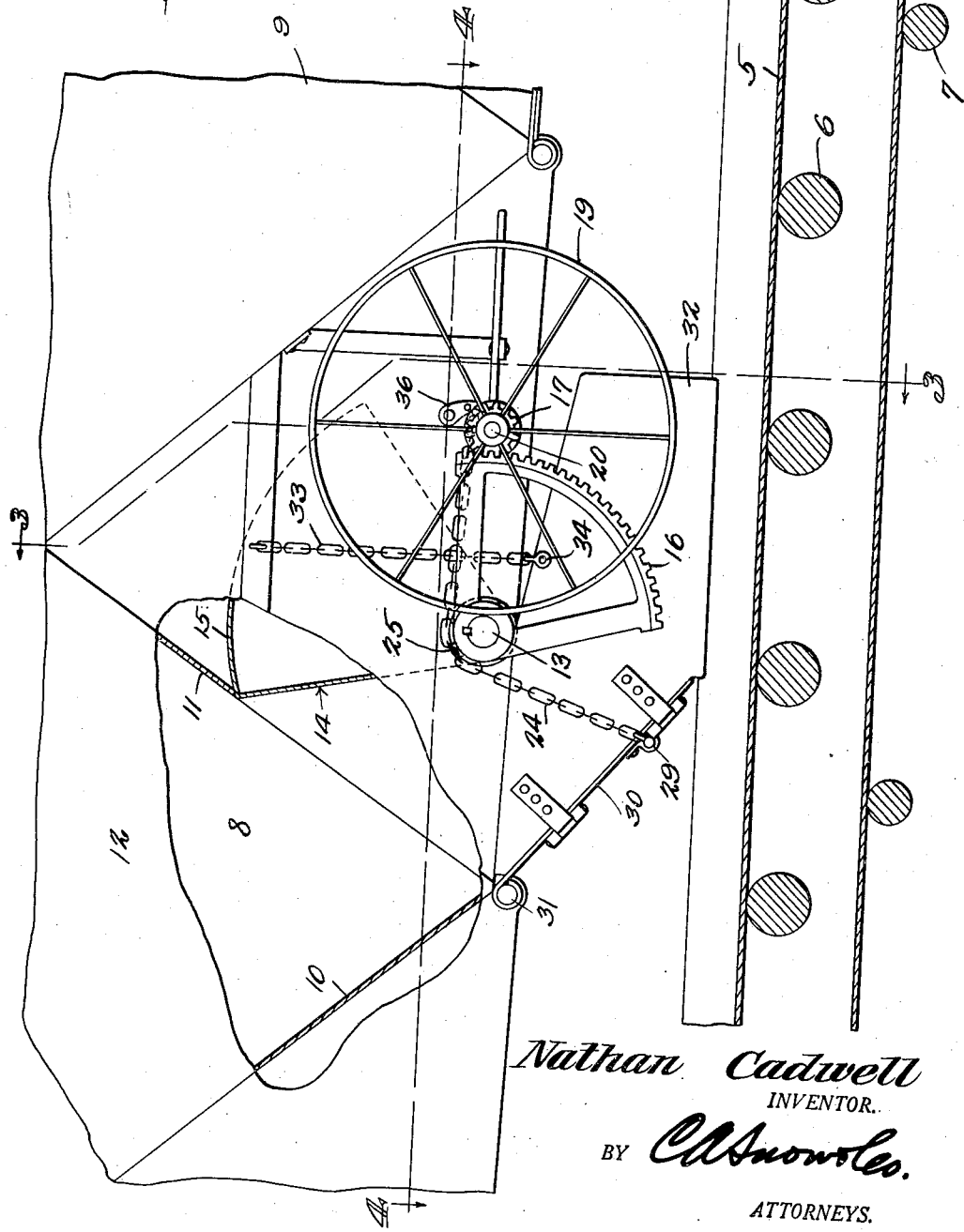

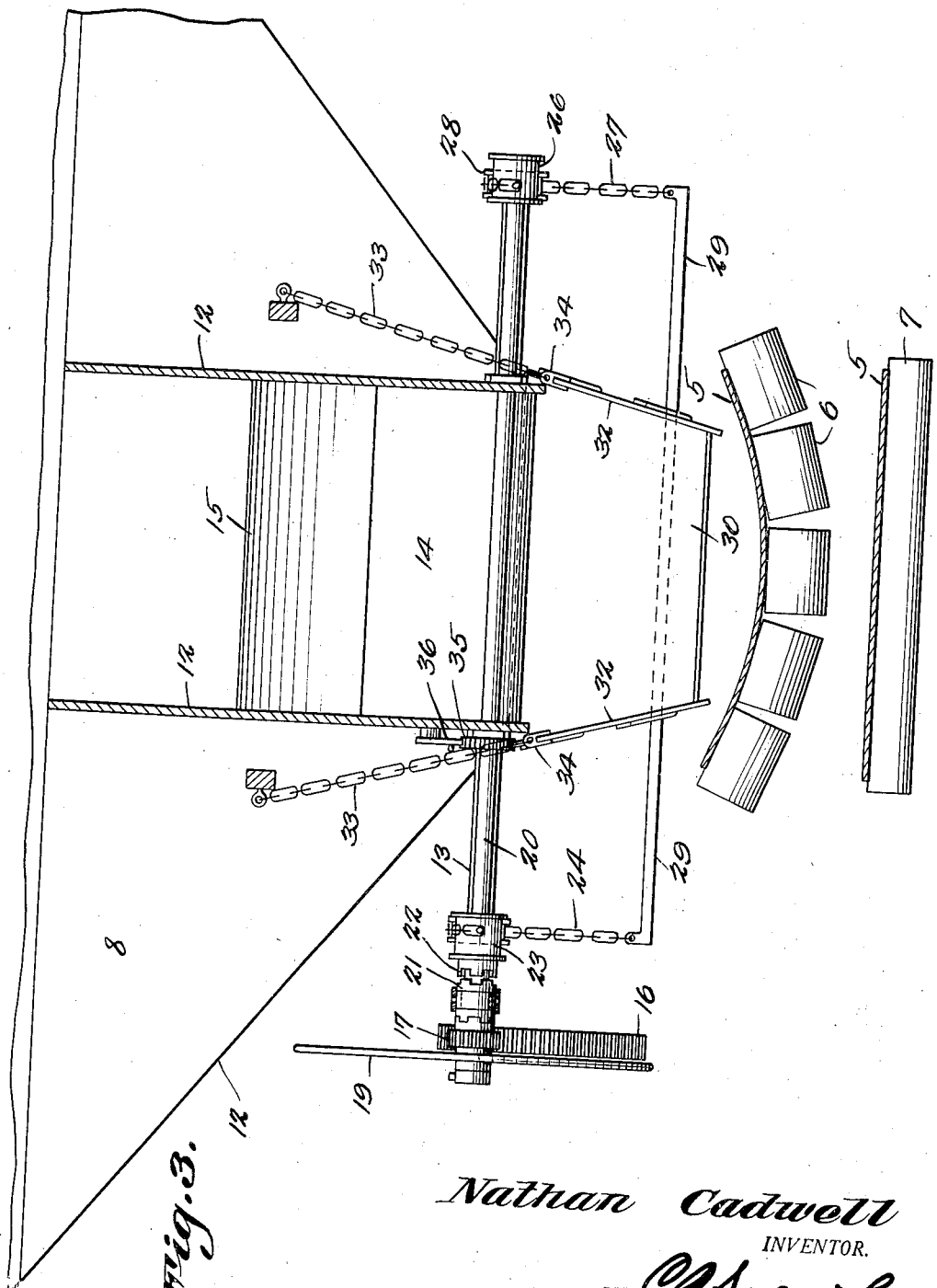

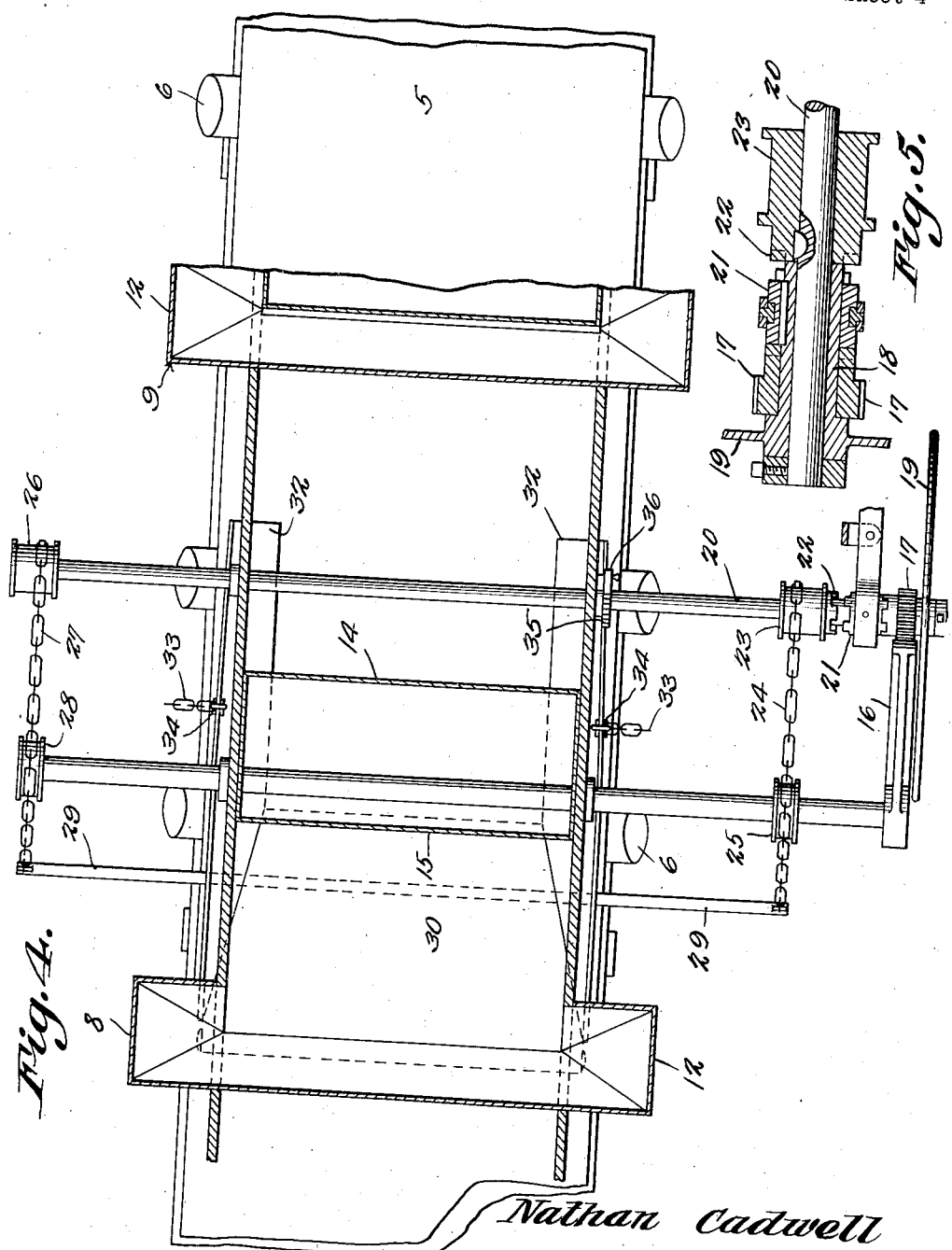

Patented Oct. 28, 1941

2,260,433

UNITED STATES PATENT OFFICE 2,260,433

UNLOADING DEVICE

Nathan Cadwell, Port Huron, Mich.

Application June 27, 1939, Serial No. 281,465

1 Claim. (Cl. 221—144)

This invention relates to a mechanical unloading device designed primarily for handling and unloading material such as coal, stone or the like from ships.

An important object of the invention is to provide a device of this character including an endless conveyor and a hopper mounted over the conveyor in such a way as to deliver the material onto the conveyor to be conveyed to cars, trucks or the like for transportation, or to deliver the material to bins or other places of deposit.

Another important object of the invention is to provide an unloading device for handling coal, stone or the like materials, embodying a swinging closure adapted to control the passage of material from the hopper, whereby the unloading operation may be carried out with facility.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is a side elevational view of an unloading device constructed in accordance with the invention, portions of the hopper being broken away illustrating the operation of the closure.

Figure 2 is a side elevational view of the device, illustrating the closure as moved to its closing position.

Figure 3 is a sectional view taken on line 3—3 of Figure 1.

Figure 4 is a sectional view taken on line 4—4 of Figure 1.

Figure 5 is a sectional view through the power shaft, illustrating the clutch mechanism employed in controlling the operation of the closure.

Referring to the drawings in detail, the reference character 5 designates the endless conveyor, forming a part of the unloading device, the endless conveyor being shown as operating over the inclined supporting rollers 6, there being provided horizontal supporting rollers 7 below the supporting rollers 6, to support the lower flight of the conveyor.

Mounted directly above the conveyor in spaced relation therewith, are hoppers 8 and 9. While these hoppers may be of any desired number, and since they are identical in construction, only one of the hoppers will be described in detail.

Each of these hoppers includes an inclined rear wall 10 and an inclined forward wall 11 the side walls of the hopper being indicated by the reference character 12. Positioned in suitable bearings formed in the side walls of the hopper, is a shaft 13 which is of a length so that the ends of the shaft extend appreciable distances beyond the side walls 12, as clearly shown by Figure 4 of the drawings. This shaft 13 provides a support for the pivoted closure 14 which has a curved inner end 15 of a width to close the discharge opening formed in the inclined forward wall of the hopper, as shown by Figure 2 of the drawings.

Secured to one end of the shaft 13, is a segmental gear 16, the teeth thereof being in mesh with the pinion 17 which is loosely mounted on the tubular shaft 18, extending inwardly from one end of the operating wheel 19. The operating wheel 19 is mounted on one end of the shaft 20 that also extends through suitable bearings formed in the side walls of the hopper, the ends of the shaft 20 extending appreciable distances beyond the side walls of the hopper.

The inner end of the hub of the pinion 17 is formed with a clutch face adapted to be engaged by the clutch face at one end of the clutch member 21 which is splined on the tubular shaft 18. This clutch member 21 also cooperates with the clutch face 22 formed at one end of the reel 23 that is keyed to the shaft 20. Thus it will be seen that due to this construction, the reel 23 may be rotated to wind the chain 24 thereon, the chain 24 being shown as moving over the pulley 25.

At one end of the shaft 20 is another reel 26 over which the chain 27 is wound, the chain 27 passing over the pulley 28 mounted on the shaft 13.

The ends of the chains 24 and 27 extend downwardly, where they connect with the rod 29 that is secured to the drop gate 30 which is pivotally mounted on the shaft 31 mounted at the discharge end of the hopper.

Hingedly connected with the side edges of the drop gate 30, are skirt boards 32 that extend upwardly and guard the material passing from the hopper, confining the material to the endless conveyor. Chains indicated by the reference character 33 have their upper ends secured to the frame of the hopper, the lower ends thereof being secured to the upper edges of the skirt boards, at 34. Thus it will be seen that as the drop gate is moved to allow material to fall onto the endless conveyor, the weight of the drop gate and material moving thereover, will be suspended by the chains 33.

When the gate 30 is moved upwardly to its closed or inactive position, the skirt boards 32 swing inwardly and rest on the gate 30, as clearly shown by Figure 2 of the drawings.

It will also be seen that the construction of the drop gate is such that it is inclined towards the direction of travel of material passing from the hopper to prevent the piling up of the material at one point on the conveyor to retard the unloading operation. Secured to the shaft 20, is a ratchet wheel 35 adapted to be engaged by the pawl 36 carried by the frame of the hopper, so that the shaft 20 may be held against movement after it has been moved to adjust the drop gate 30.

From the foregoing it will be seen that due to the construction shown and described, the clutch member may be operated to clutch the shaft 20 with the tubular shaft 18, with the result that when the operating wheel 19 is rotated in a clockwise direction, the chains 24 and 27 will be wound on their drums, elevating the drop gate to prevent further discharge of material onto the endless conveyor.

When it is desired to operate the pivoted closure, the clutch member 21 is moved to clutch the pinion 17 to the tubular shaft 18. The operating wheel 19 may now be rotated to move the pivoted closure to the desired position for allowing a predetermined quantity of material to pass from the hopper.

In view of the foregoing detail disclosure, it is believed that a further detail disclosure as to the operation of the device is unnecessary.

What is claimed is:

A loading device comprising a hopper having a discharge opening in the front wall thereof, a closure adapted to close the discharge opening, a substantially long shaft on which said closure is mounted, pulleys mounted adjacent to the ends of said shaft, a drop gate mounted at the discharge end of the hopper, skirt boards pivotally connected to the side edges of said drop gate, a substantially long rod, secured to the drop gate, the ends of said rod extending appreciable distances beyond the skirt boards and terminating directly under said pulleys, operating chains connected to the outer ends of said rod and adapted to move over said pulleys in substantially vertical lines, and means for operating the chains, whereby the drop gate and skirt boards are raised and lowered.

NATHAN CADWELL.